Patented Dec. 4, 1928.

1,693,930

UNITED STATES PATENT OFFICE.

CHARLES B. LIPMAN AND AARON GORDON, OF BERKELEY, CALIFORNIA, ASSIGNORS TO REGENTS OF THE UNIVERSITY OF CALIFORNIA, OF BERKELEY, CALIFORNIA, A CORPORATION.

METHOD OF IMPREGNATING WOOD WITH SUBSTANCES TOXIC TO ANIMAL AND BACTERIAL LIFE AND FUNGUS GROWTHS.

No Drawing.   Application filed September 9, 1926   Serial No. 134,572.

This invention relates to a method of protecting trees intended for use in piling, telephone poles, fence posts, railroad ties, etc., with a toxic substance for the purpose of protecting the timber against teredos, termines, and other wood-boring and wood-attacking organisms.

The object of the present invention is to secure in a simple and economical manner a thorough distribution or impregnation of toxic substances throughout the entire cellular fibrous structure of a living tree by utilizing the natural circulation or sap flow of the tree to carry and distribute the toxic material, thereby producing a timber immune to the attack of animal, bacterial and other wood destroying organisms, and also a timber which is materially increased both in tensile, compression and shearing strength.

The method consists in the injection of live trees before they are felled, with a toxic substance as will hereinafter be described. Certain toxic substances which may be employed are as follows:—

1st. Copper arsenate, copper sulphate, copper chloride, copper nitrate or any other copper salt.

2nd. Soluble salts of mercury, zinc and lead may be used in quantities adaptable in each case.

3rd. Creosote, or the toxic and soluble constituents thereof may be injected in suitable quantities in place of copper arsenate.

4th. Any salt mixture containing any of the foregoing substances or mixtures therein may be injected in suitable quantities.

5th. Any soluble chemical compound or combination of compounds which is toxic to wood-boring and wood-destroying organisms may be injected.

In actual practise we prefer copper arsenate 10 to 500 grams per tree depending upon the size of the tree. This salt is dissolved in three or more liters of water, the hydrogen ion concentration being adjusted by means of additions of acid or alkali so as to render it thoroughly soluble. In the case of addition of acid, any strong acid may be used, such as sulphuric acid. In the case of addition of an alkali ammonium hydroxide is preferable. In certain instances if acid is used the injection of copper arsenate is followed, in order to insure reduction, by the injection of a solution of dextrose, for instance 50 grams dissolved in three liters of water. The method of injection will be as follows:—

At a distance of several inches to two feet from the ground, a hole is bored into the trunk of the tree, almost at right angles to the direction of the trunk. For this purpose, a wood augur is employed with a bit of ⅜ to ½ inch in diameter. The hole is bored about three-fourths through the diameter of the trunk of the tree. The shavings are removed from the hole and a glass tube approximately two or three inches in length just fitting into the hole is inserted, but only deep enough to make a stable connection. A specially prepared sealing wax is melted around the junction of the glass tube and the tree trunk so as to seal the hole from the outer air, and by means of a long rubber tube the glass tube is connected to a reservoir containing the solution. The solution thus enters the natural circulating system of the living tree and a toxic substance in soluble form is thereby spread throughout all of the cellular and fibrous structure of the wood in every part of the tree with the exception of the bark. Therefore, any animal or plant organism which attacks and digests the wood will be killed by the absorption into its system of the poison or toxic substance injected.

In actual practise we have found that the reservoir should preferably be placed at an elevation of approximately twenty feet above the hole. At this elevation the penetration of the solution is greatest; in certain varieties three liters of the solution have been absorbed in from twelve to thirteen minutes. After the injection, the reservoir together with the rubber tubing and the glass tube is removed and the live tree is permitted to stand in some instances two or three days thus insuring thorough penetration and distribution of the toxic substance to all parts of the tree. The tree may then be cut in the usual manner and the wood seasoned when it is ready for use. Actual experience has proven that wood so treated is thoroughly and uniformly impregnated with a toxic substance as the sap flow insures positive distribution along the line of fibres and cells in every part of the tree, with the exception of the bark.

A timber or product which is resistant to all sorts of wood destroying organisms is obtained and the decay by chemical oxidations is prevented; further it has been found that greater tensile, compression and shearing strength is obtained due to a marked increase in hardness of the wood imparted to it by the metallic salts.

Having thus described our invention, what we claim and desire to secure by Letters Patent is:—

1. A method of protecting wood with a substance toxic to animal and bacterial life and fungus growth, which consists in injecting into a living tree a toxic substance capable of distribution by the sap flow of the tree and permitting the toxic substance to be distributed throughout the entire cellular and fibrous structure of the tree by the actual sap circulation of the tree and then treating said structure to reduce and fix the toxic substance within the cellular and fibrous structure of the tree.

2. A method of protecting wood with a substance toxic to animal and bacterial life and fungus growth, which consists in injecting into a living tree a solution of copper salt and permitting the copper salt to be distributed throughout the entire cellular and fibrous structure of the tree by the natural sap circulation of the tree and then treating said structure to reduce and fix the toxic substance within the cellular and fibrous structure of the tree.

3. A method of protecting wood with a substance toxic to animal and bacterial like and fungus growth, which consists in injecting into a living tree copper arsenate dissolved in water and permitting the dissolved copper arsenate to be distributed throughout the entire cellular and fibrous structure of the tree by the natural sap circulation of the tree and then treating said structure to reduce and fix the toxic substance within the cellular and fibrous structure of the tree.

4. A method of treating living trees intended for piling, etc., to render the piling safe against attack of teredos etc., which consists in injecting into the tree a solution of copper arsenate, permitting the copper arsenate to be distributed throughout the entire cellular and fibrous structure of the tree by the natural sap circulation of the tree and then treating said structure to reduce and fix the toxic substance within the cellular and fibrous structure of the tree.

5. A method of protecting wood with a substance toxic to animal and bacterial life and fungus growth which consists in boring a hole into the trunk of the tree at right angles to the direction of the tree trunk and about three-fourths through the diameter of the trunk, inserting a tube in the outer end of the hole, sealing the tube with relation to the hole connecting an elevated reservoir with the tube, placing a solution of copper arsenate in the reservoir to permit the solution to enter the hole in the tree under slight pressure and to permit the copper arsenate to be distributed through the entire cellular and fibrous structure of the tree by the natural sap circulation of the tree and then similarly introducing an agent into the tree to reduce the toxic substance with which the cellular and fibrous structure had been previously impregnated and by which action the toxic agent will be fixed.

6. A method of increasing tensile, compression and shearing strength of timber which consists in injecting into a living tree a solution of a metallic salt and permitting the metallic salt to be distributed throughout the entire cellular and fibrous structure of the tree, by the natural sap circulation of the tree and then treating said structure to reduce and fix the toxic substance within the cellular and fibrous structure of the tree.

CHARLES B. LIPMAN.
AARON GORDON.